United States Patent
Fukui et al.

(10) Patent No.: US 11,857,906 B2
(45) Date of Patent: Jan. 2, 2024

(54) AIR CLEANER

(71) Applicant: SUZUKI MOTOR CORPORATION, Hamamatsu (JP)

(72) Inventors: Akihito Fukui, Hamamatsu (JP); Makoto Kaneko, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 17/939,835

(22) Filed: Sep. 7, 2022

(65) Prior Publication Data

US 2023/0149845 A1 May 18, 2023

(30) Foreign Application Priority Data

Nov. 15, 2021 (JP) .................................. 2021-185549

(51) Int. Cl.
| | | |
|---|---|---|
| *F02M 35/02* | (2006.01) | |
| *B01D 46/44* | (2006.01) | |
| *B62J 40/10* | (2020.01) | |
| *B01D 46/00* | (2022.01) | |

(52) U.S. Cl.
CPC ....... *B01D 46/448* (2013.01); *B01D 46/0005* (2013.01); *B62J 40/10* (2020.02); *F02M 35/0204* (2013.01); *F02M 35/0205* (2013.01); *B01D 2279/40* (2013.01)

(58) Field of Classification Search
CPC .............. B01D 46/448; B01D 46/0005; B01D 2279/40; B62J 40/10; F02M 35/0204; F02M 35/0205; F02M 35/10091; F02M 35/1038; F02M 35/162; F02M 35/0207; F02M 35/10039
See application file for complete search history.

(56) References Cited

U.S. PATENT DOCUMENTS

| | | | |
|---|---|---|---|
| 5,950,586 A | 9/1999 | Ropertz | 123/184.42 |
| 8,151,754 B2 | 4/2012 | Matsuda et al. | 123/184.52 |
| 9,140,222 B2 | 9/2015 | Shimomura et al. | 123/184.21 |
| 2005/0188959 A1 | 9/2005 | Udono | 123/470 |
| 2005/0205067 A1* | 9/2005 | Koide | F02M 35/10144 |
| | | | 123/470 |

(Continued)

FOREIGN PATENT DOCUMENTS

| | | | | |
|---|---|---|---|---|
| CN | 102654088 A | * | 9/2012 | ........... F02M 35/162 |
| EP | 1 749 985 A1 | | 2/2007 | |

(Continued)

OTHER PUBLICATIONS

Extended European Search Report dated Mar. 17, 2023 to corresponding European Application No. 22194263.4.

*Primary Examiner* — Hung Q Nguyen
(74) *Attorney, Agent, or Firm* — Stein IP, LLC

(57) ABSTRACT

There is provided an air cleaner configured to be disposed inside a vehicle body frame, the air cleaner including: an air cleaner case in which an intake chamber is formed; an intake air temperature sensor configured to detect an intake air temperature in the intake chamber; an inlet tube configured to take in air to the intake chamber; and an outlet tube configured to send out air from the intake chamber. The outlet tube has an upstream portion protruding into the intake chamber, and the upstream portion of the outlet tube has a peripheral wall formed with a through hole.

6 Claims, 9 Drawing Sheets

(56) References Cited

U.S. PATENT DOCUMENTS

2019/0293032 A1  9/2019  Kamiya et al. .... F02M 35/0205

FOREIGN PATENT DOCUMENTS

| JP | 2007510858 | A | * | 4/2007 | |
|----|----|----|----|----|----|
| JP | 4121392 | B2 | | 7/2008 | |
| JP | 2012-159010 | A | | 8/2012 | |
| KR | 20040027382 | A | * | 4/2004 | |
| TW | 200408762 | A | * | 6/2004 | ............. B62K 11/10 |

* cited by examiner

AIR CLEANER

CROSS-REFERENCE TO RELATED APPLICATIONS

This application is based on Japanese Patent Application No. 2021-185549 filed on Nov. 15, 2021, the contents of which are incorporated herein by way of reference.

TECHNICAL FIELD

The present invention relates to an air cleaner.

BACKGROUND

As a straddle-type vehicle, there is known a straddle-type vehicle in which an air cleaner is disposed behind an engine (for example, see Patent Literature 1). In the air cleaner disclosed in Patent Literature 1, an inlet tube is attached to a rear surface of an air cleaner case, and an outlet tube is attached to a front surface of the air cleaner case. Air is taken into the air cleaner case from the inlet tube, and the air is filtered by a filter disposed in the air cleaner. Then, the clean air enters the outlet tube from the air cleaner, and the clean air is sent out to a throttle body through the outlet tube.

Patent Literature 1: Japanese Patent No. 4121392

However, the air cleaner described in Patent Document 1 is disposed in a narrow space inside a vehicle body frame below a seat. Therefore, the position for arranging the intake air temperature sensor with respect to the air cleaner is also limited. When the intake air temperature sensor is arranged at a position deviated from the air flow in the air cleaner, there is a possibility that an accurate intake air temperature cannot be detected by the intake air temperature sensor.

The present invention has been made in view of the above circumstances, and an object thereof is to provide an air cleaner capable of improving the detection accuracy of an intake air temperature sensor.

SUMMARY

An air cleaner according to an aspect of the present invention is configured to be disposed inside a vehicle body frame, and includes: an air cleaner case in which an intake chamber is formed; an intake air temperature sensor configured to detect an intake air temperature in the intake chamber; an inlet tube configured to take in air to the intake chamber; and an outlet tube configured to send out air from the intake chamber. The outlet tube has an upstream portion protruding into the intake chamber, and the upstream portion of the outlet tube has a peripheral wall formed with a through hole, thereby solving the above-described problem.

DESCRIPTION OF EMBODIMENTS

An air cleaner according to an aspect of the present invention is disposed inside a vehicle body frame. An intake chamber is formed in an air cleaner case of the air cleaner, and an intake air temperature of the intake chamber is detected by an intake air temperature sensor. Air is taken into the intake chamber through an inlet tube, and air is sent out from the intake chamber through an outlet tube. The outlet tube has an upstream portion protruding into the intake chamber. The upstream portion of the outlet tube has a peripheral wall formed with a through hole. The main air flow is formed from the inlet tube to the outlet tube. Air flows out from the through hole of the outlet tube, and air flow is also created at positions deviated from the main air flow. Even if the intake air temperature sensor is disposed at a position deviated from the main air flow, the detection accuracy of the intake air temperature sensor can be improved.

Embodiments

Figure 1:
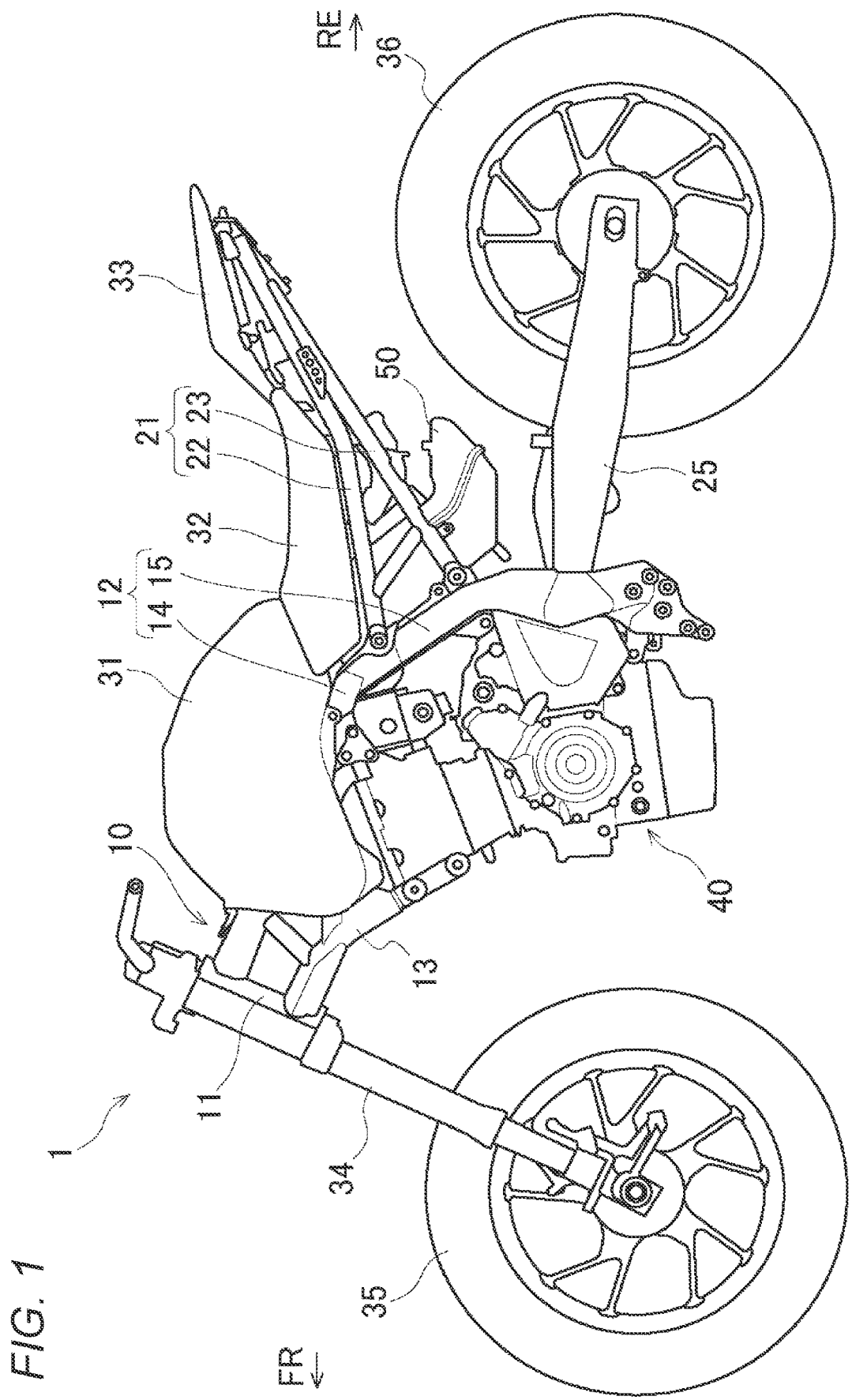
FIG. 1 is a left side view of a straddle-type vehicle according to the present embodiment.

Hereinafter, a present embodiment will be described in detail with reference to the accompanying drawings. FIG. 1 is a left side view of a straddle-type vehicle according to the present embodiment in addition, in the drawings to be described later, an arrow FR indicates a vehicle front side, an arrow RE indicates a vehicle rear side, an arrow L indicates a vehicle left side, and an arrow R indicates a vehicle right side.

As shown in FIG. 1, a straddle-type vehicle 1 is formed by mounting various components such as an engine 40 and an electrical system on a diamond-type vehicle body frame 10 formed of a pipe and a sheet metal. The vehicle body frame 10 includes a pair of main frames 12 that are branched off from a head pipe 11 to the left and right and extend rearward, and a pair of down frames 13 that are branched off from the head pipe 11 to the left and right and extend downward. A rear portion of the engine 40 is supported by the pair of main frames 12, and a front portion of the engine 40 is supported by the pair of down frames 13. By supporting the engine 40 with the vehicle body frame 10, the rigidity of an entire vehicle is secured.

A front side portion of the main frame 12 is a tank rail 14 located above the engine 40, and a fuel tank 31 is supported from below by the tank rail 14. A rear side portion of the main frame 12 is a body frame 15 located behind the engine 40, and a swing arm 25 is swingably supported by a lower half portion of the body frame 15. Seat rails 21 each including an upper rail 22 and a lower rail 23 are attached to an upper half portion of the body frame 15. A rider seat 32 and a pillion seat 33 are supported on an upper portion of the upper rail 22 at the rear of the fuel tank 31.

A pair of front forks 34 is steerably supported by the head pipe 11 via a steering shaft (not shown). A front wheel 35 is rotatably supported by lower portions of the front forks 34, and an upper portion of the front wheel 35 is covered with a front fender (not shown). The swing arm 25 extends rearward from the body frame 15. A rear wheel 36 is rotatably supported at the rear end of the swing arm 25, and the upper side of the rear wheel 36 is covered with a rear fender (not shown). The engine 40 is coupled to the rear wheel 36 via a chain drive type transmission mechanism, and power from the engine 40 is transmitted to the rear wheel 36 via the transmission mechanism.

An air cleaner 50 is disposed behind the engine 40. Behind the engine 40, the space for arranging the air cleaner is limited due to the frame width of the main frame 12 and the rail width of the seat rails 21, and it is difficult to secure the capacity of the air cleaner 50 for securing the required output of the engine 40. The intake air temperature in the air cleaner 50 is detected by the intake air temperature sensor. The detection accuracy is reduced when the intake air temperature sensor is arranged at a position deviated from the main air flow to satisfy the capacity of the air cleaner 50 and smooth air flow. Therefore, in the present embodiment, the air flow is also created at positions deviated from the main air flow of the air cleaner 50 to improve the detection accuracy of the intake air temperature sensor.

Figure 2:
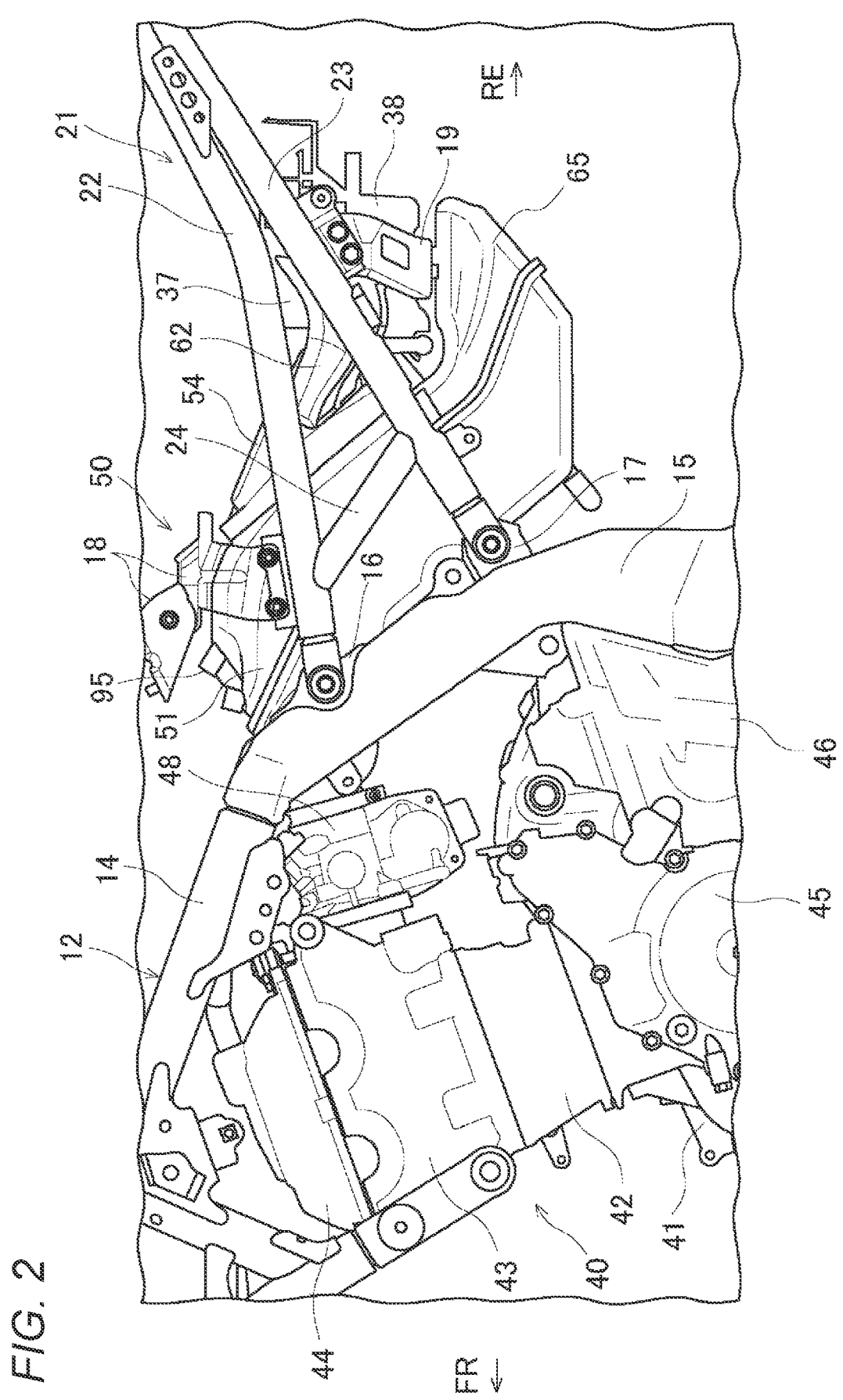
FIG. 2 is a left side view of the periphery of an engine according to the present embodiment.
Figure 3:
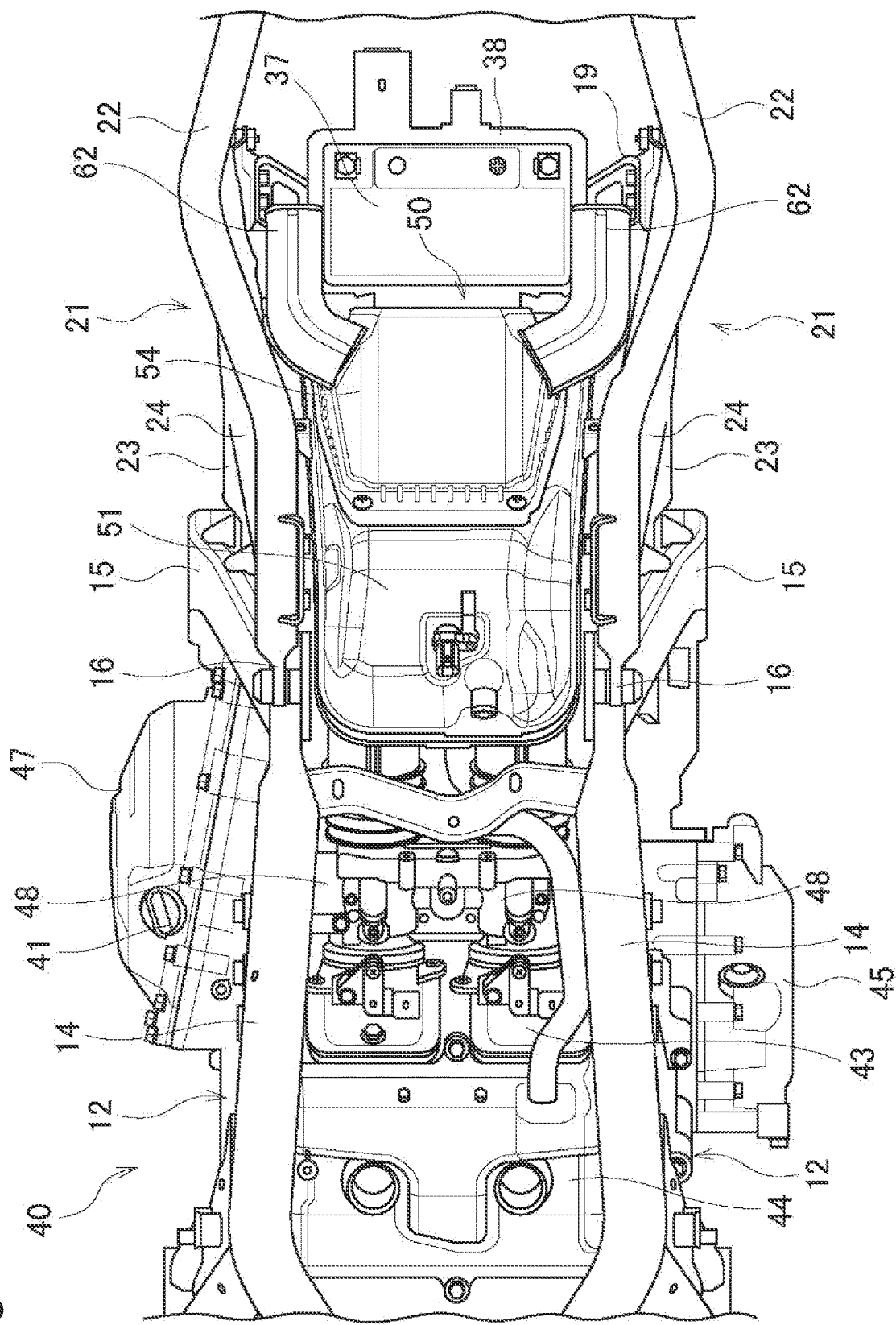
FIG. 3 is a top view of the periphery of the engine according to the present embodiment.
Figure 4:
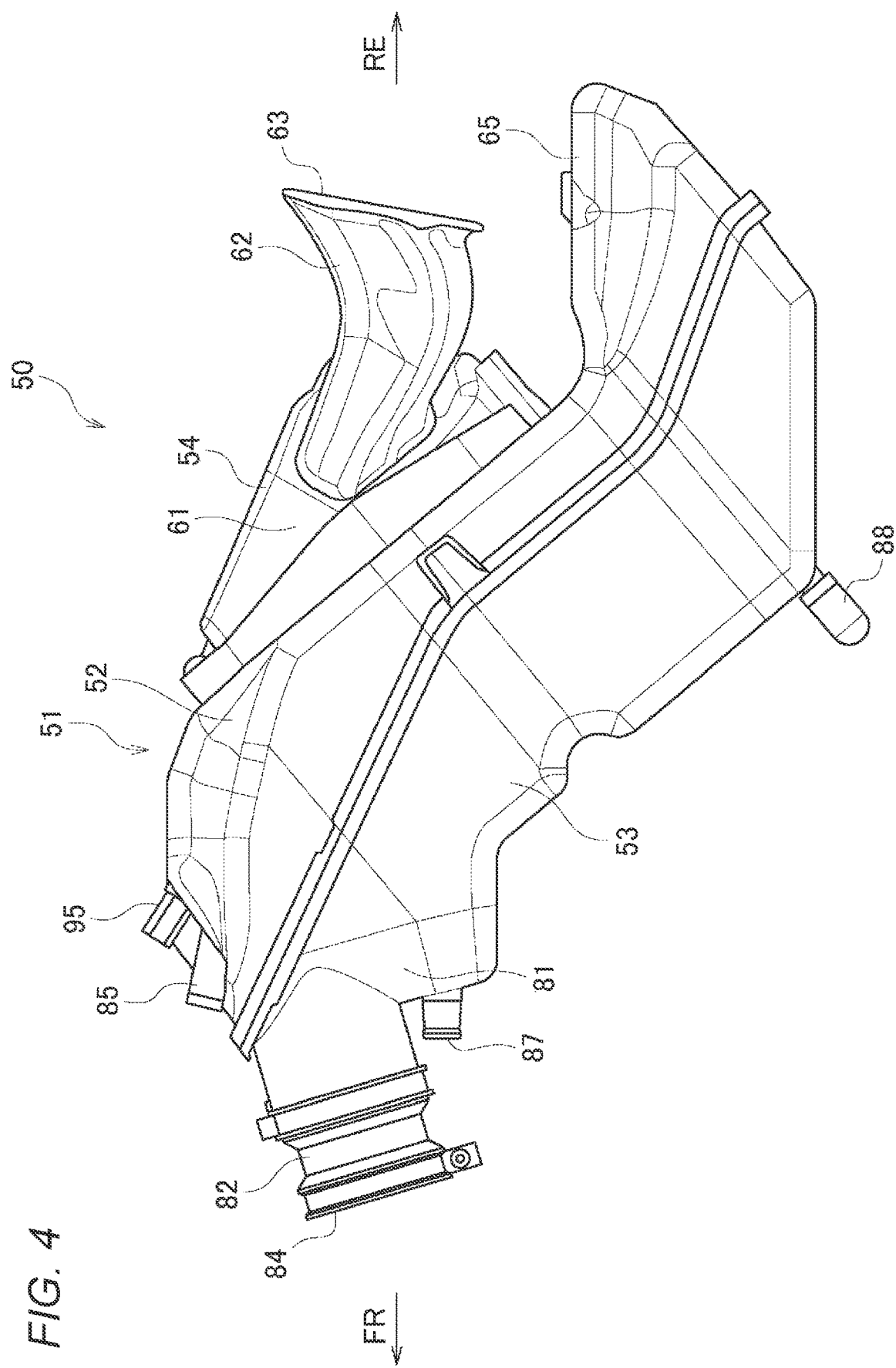
FIG. 4 is a side view of an air cleaner according to the present embodiment.
Figure 5:
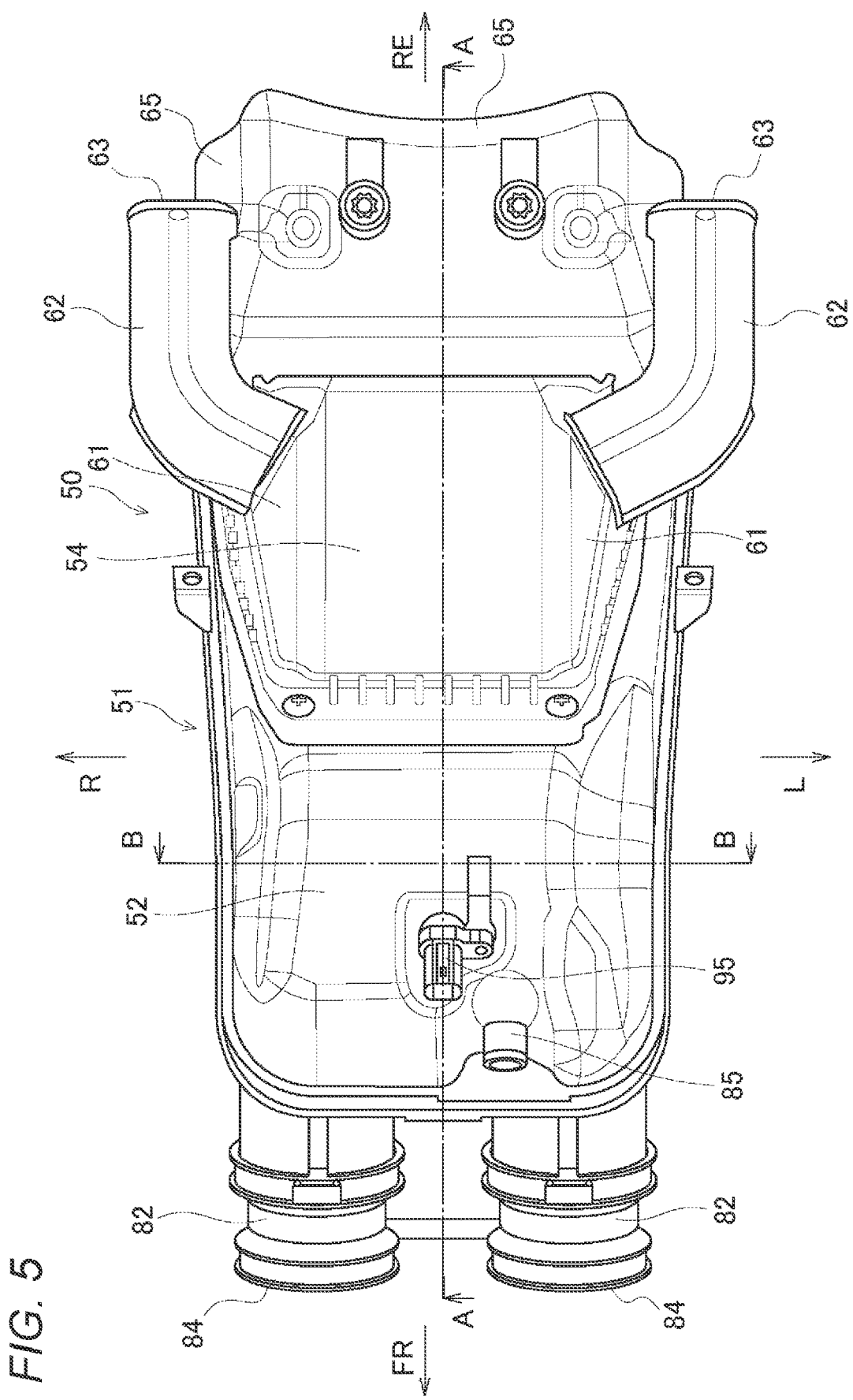
FIG. 5 is a top view of the air cleaner of the present embodiment.
Figure 6:
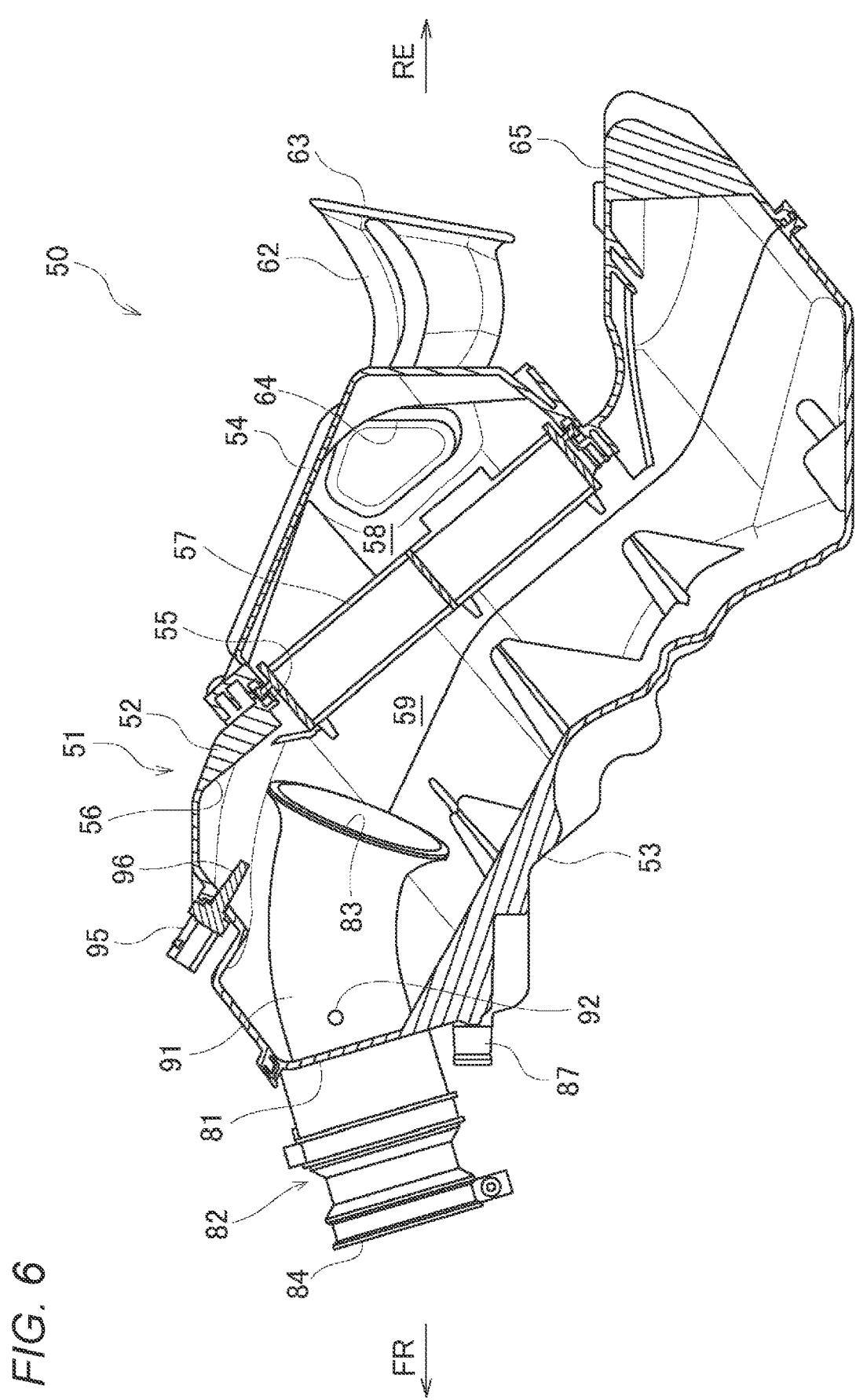
FIG. 6 is a cross-sectional view of the air cleaner of FIG. 5 taken along a line A-A.
Figure 7:
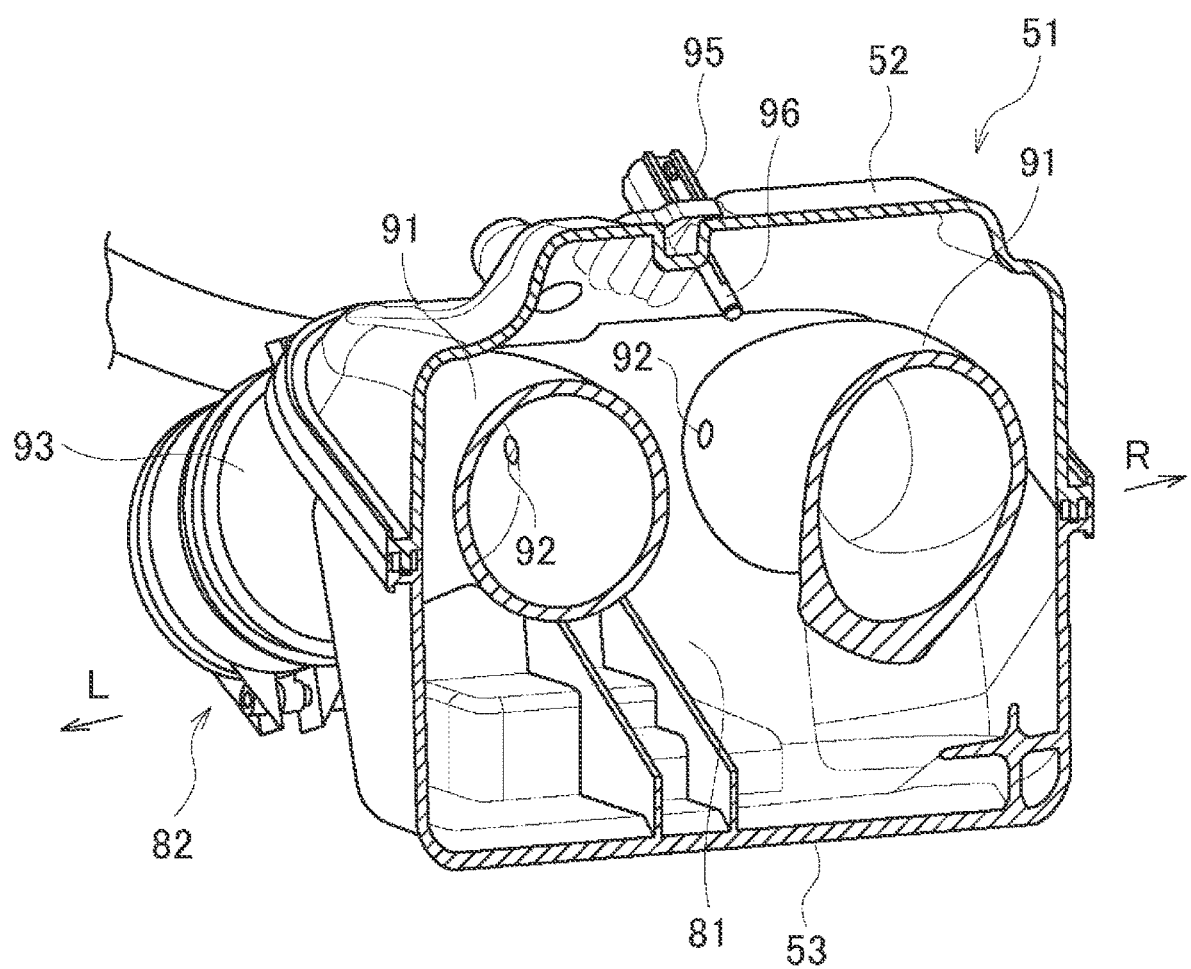
FIG. 7 is a cross-sectional perspective view of the air cleaner of FIG. 5 taken along a line B-B.
Figure 8:
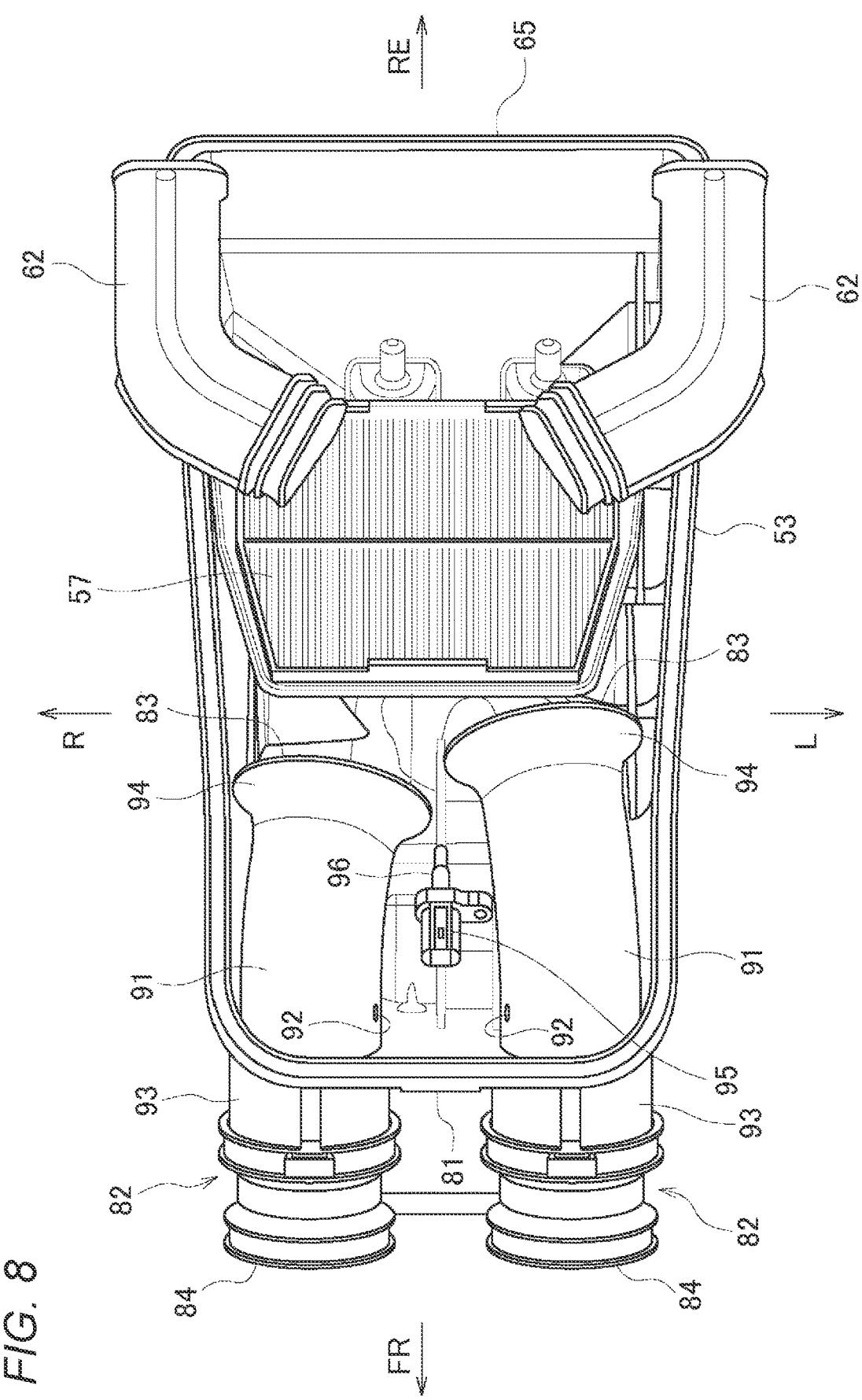
FIG. 8 is a top view of the air cleaner of FIG. 5 from which an upper case is removed.

A peripheral configuration of the engine and the air cleaner will be described with reference to FIGS. 2 to 8. FIG. 2 is a left side view of the periphery of the engine according to the present embodiment. FIG. 3 is a top view of the periphery of the engine according to the present embodiment. FIG. 4 is a side view of the air cleaner according to the present embodiment. FIG. 5 is a top view of the air cleaner according to the present embodiment. FIG. 6 is a cross-sectional view of the air cleaner of FIG. 5 taken along a line A-A. FIG. 7 is a cross-sectional perspective view of the air cleaner of FIG. 5 taken along a line B-B. FIG. 8 is a top view of the air cleaner of FIG. 5 from which an upper case is removed.

As shown in FIGS. 2 and 3, the engine 40 is a two-cylinder engine, and includes a crankcase 41 having an upper-lower divided structure. A cylinder 42, a cylinder head 43, and a cylinder head cover 44 are attached to an upper portion of the crankcase 41. A magneto cover 45 that covers a magneto (not shown) from a side is attached to a left side surface of the crankcase 41. A sprocket cover 46 that covers a drive sprocket (not shown) from the side is attached to the rear of the magneto cover 45. A clutch cover 47 that covers a clutch (not shown) from the side is attached to a right side surface of the crankcase 41.

A throttle body 48 is connected to a rear surface of the cylinder head 43, and the air cleaner 50 is connected to an upstream side (rear side) of the throttle body 48. The air cleaner 50 is disposed behind the engine 40 and inside the pair of main frames 12 and the pair of seat rails 21. As described above, the rear portions of the pair of main frames 12 are the pair of body frames 15, and a front end portion of the air cleaner 50 is located inside the pair of body frames 15. The upper half portion of the body frame 15 is inclined obliquely downward toward the rear, and an air cleaner case 51 behind the body frame 15 is also inclined obliquely downward.

An upper bracket 16 and a lower bracket 17 are formed at a rear edge of the upper half portion of the body frame 15. The upper rail 22 of the seat rail 21 is connected to the upper bracket 16, and the lower rail 23 of the seat rail 21 is connected to the lower bracket 17. The upper rail 22 extends rearward across a side of an upper half portion of the air cleaner case 51, and the lower rail 23 extends obliquely rearward across a side of a lower half portion of the air cleaner case 51. Front sides of the upper rail 22 and the lower rail 23 are coupled to each other via a bridge pipe 24, and rear sides of the upper rail 22 and the lower rail 23 are coupled to each other at a vehicle rear portion.

A front portion of the air cleaner case 51 protrudes upward from the upper rail 22, and a protruding portion of the front portion is accommodated in a space inside the rider seat 32 (see FIG. 1). A rear portion of the air cleaner case 51 protrudes downward from the lower rail 23, and a protruding portion of the rear portion serves as an expansion portion 65 that expands an intake chamber 56 (see FIG. 6) in the air cleaner case 51. The expansion portion 65 of the air cleaner case 51 is located above the swing arm 25 (see FIG. 1), and the expansion portion 65 extends rearward so as to avoid a swing range of the swing arm 25. A volume of the air cleaner case 51 is expanded by using a lower space of the seat rail 21.

A battery case 38 and a battery 37 are disposed above the expansion portion 65 of the air cleaner case 51. The battery case 38 is supported by the pair of seat rails 21 via a bridge 19. The battery case 38 is formed in a box shape having an open upper surface, and a rectangular parallelepiped battery 37 is held inside the battery case 38. In a top view, the pair of inlet tubes 62 of the air cleaner 50 are curved, and the battery 37 is located between the pair of inlet tubes 62. A space for arranging the battery 37 is secured by using a space above the expansion portion 65 of the air cleaner 50.

As shown in FIGS. 4 to 6, the air cleaner case 51 of the air cleaner 50 includes an upper case 52 and a lower case 53 which are divided in an upper-lower direction, and a filter cover 54 attached to a rear surface of the upper case 52. The upper case 52 and the lower case 53 extend obliquely downward from the front to the rear, and the filter cover 54 bulges in a dome shape on a rear side of the upper case 52. Internal spaces of the upper case 52 and the lower case 53 and an internal space of the filter cover 54 are connected to each other through an opening 55 formed in the rear surface of the upper case 52, and an intake chamber 56 is formed inside the air cleaner case 51.

An air filter 57 is disposed in the opening 55 in the rear surface of the upper case 52, and the air filter 57 is covered by the filter cover 54 from behind. The air filter 57 is inclined along an upper surface of the upper case 52 such that an upper portion of the air filter 57 is located closer to the vehicle front side than a lower portion. By the air filter 57, the intake chamber 56 is divided into a dirty side 58 and a clean side 59. That is, the dirty side 58 is formed by the filter cover 54 on the upstream side of the air filter 57, and the clean side 59 is formed by the upper case 52 and the lower case 53 downstream of the air filter 57.

A pair of inlet tubes 62 are attached to left and right side walls 61 of the filter cover 54. The pair of inlet tubes 62 extend from the left and right side walls 61 of the filter cover 54 toward the vehicle rear side, and air is taken into the dirty side 58 from the rear of the vehicle by the pair of inlet tubes 62. A suction port 63 of each inlet tube 62 is directed toward the rear of the vehicle, and a discharge port 64 of the inlet tube 62 is directed inward in the vehicle width direction. The pair of inlet tubes 62 are located inside the pair of seat rails 21 (see FIG. 3), and an interval between the pair of inlet tubes 62 is substantially equal to a lateral width of the expansion portion 65.

A pair of outlet tubes 82 are attached to a front wall 81 of the lower case 53. The pair of outlet tubes 82 penetrate the front wall 81 of the lower case 53 and extend in a front-rear direction, and air is sent out from the clean side 59 to the engine 40 (see FIG. 1) by the pair of outlet tubes 82. A suction port 83 of each outlet tube 82 is directed toward the rear of the vehicle, and a discharge port 84 of the outlet tube 82 is directed toward the front of the vehicle. The pair of outlet tubes 82 are located inside the pair of main frames 12

(see FIG. 3), and the pair of outlet tubes 82 are connected to the pair of the throttle bodies 48 (see FIG. 2).

The inlet tubes 62 and the outlet tubes 82 are attached to an upper side of the air cleaner case 51. As described above, the inlet tubes 62 are attached to the filter cover 54, the outlet tubes 82 are attached to the front wall 81 of the lower case 53, and the filter cover 54 and the front wall 81 of the lower case 53 face each other in the front-rear direction via the air filter 57 in a side view. Since the discharge port 64 of each inlet tube 62 and the suction port 83 of each outlet tube 82 are located at substantially the same height, air easily flows directly from the inlet tube 62 to the outlet tube 82.

During low rotation of the engine 40 and steady traveling, the main air flow from the discharge port 64 of the inlet tube 62 toward the suction port 83 of each outlet tube 82 is formed. The pair of outlet tubes 82 each has an upstream portion 91 protruding into the intake chamber 56. The upstream portion 91 has a peripheral wall formed with a through hole 92. In the air cleaner case 51, an air flow from the through hole 92 toward the suction port 83 of the outlet tube 82 is formed in addition to the main air flow. The upper wall of the upper case 52 is attached with an intake air temperature sensor 95 that detects the intake air temperature of the air flowing out from the through hole 92. The detection result of the intake air temperature sensor 95 is used to control the fuel injection amount.

The upper wall of the upper case 52 protrudes upward from the upper rail 22 (see FIG. 2), The upper wall of the upper case 52 is partially recessed, and the intake air temperature sensor 95 is disposed in the recess of the upper case 52 so as to face obliquely upward. The proximal end side of the intake air temperature sensor 95 is exposed to the outside of the case, and a detection portion 96 on the distal end side of the intake air temperature sensor 95 is inside the case. The upper surface of the upper rail 22 is provided with an attachment bracket 18 (see FIG. 2) for the fuel tank 31, and the intake air temperature sensor 95 is positioned below the attachment bracket 18. In this way, the intake air temperature sensor 95 is disposed in the upper case 52 using the space below the attachment bracket 18.

In addition, a breather nipple 85 is formed at a front portion of the upper case 52, and a breather hose (not shown) extending from the engine 40 is connected to the breather nipple 85. A secondary air nipple 87 is formed at a front portion of the lower case 53, and a secondary air hose (not shown) extending to an exhaust system is connected to the secondary air nipple 87. A drain plug 88 is provided at a bottom portion of the lower case 53, and water in the air cleaner case 51 is discharged from the drain plug 88.

As shown in FIGS. 7 and 8, the pair of outlet tubes 82 is attached to the front wall 81 of the lower case 53 so as to be spaced apart from each other in the left-right direction. Upstream portions 91 (rear sides) of the pair of outlet tubes 82 extend toward the air filter 57, and downstream portions 93 (front sides) of the pair of outlet tubes 82 are connected to the throttle body 48 (see FIG. 3). Lengths of the pair of outlet tubes 82 are different, and the outlet tube 82 on the left side is formed longer than the outlet tube 82 on the right side. The output characteristics of the engine 40 are adjusted by the difference in length between the pair of outlet tubes 82.

The suction ports 83 of the pair of outlet tubes 82 are directed toward the center of the air filter 57. The pair of outlet tubes 82 is formed with umbrella portions 94 that extend toward the suction ports 83, and the umbrella portions 94 expands the suction ports 83 of the outlet tubes 82. Since the lengths of the pair of outlet tubes 82 are different from each other and the umbrella portions 94 of the pair of outlet tubes 82 are shifted in the front-rear direction, a pair of umbrella portions 94 do not interfere with each other at the center of the air filter 57. An intake air temperature sensor 95 is disposed between the pair of outlet tubes 82 in a top view. The peripheral walls of the upstream portions 91 of the pair of outlet tubes 82 are each formed with the through hole 92.

In this case, among a peripheral wall on the inner side in the vehicle width direction and a peripheral wall on the outer side in the vehicle width direction of the upstream portion 91 of each outlet tube 82, the peripheral wall on the inner side in the vehicle width direction, which is a side closer to the intake air temperature sensor 95, is formed with the through hole 92. The air flow from the through hole 92 is directed toward the intake air temperature sensor 95. In addition, the intake air temperature sensor 95 has a detection portion 96 located downstream (forward) of the suction port 83 of the outlet tube 82 and upstream (rearward) of the through hole 92 in a top view. That is, the detection portion 96 of the intake air temperature sensor 95 is located between the suction port 83 and the through hole 92 of the outlet tube 82. The main air flow from the inlet tube 62 toward the outlet tube 82 is not interfered by the intake air temperature sensor 95.

In the air cleaner case 51, an air flow from the through hole 92 toward the suction port 83 of the outlet tube 82 is formed in addition to the main air flow from the inlet tube 62 toward the outlet tube 82, The detection portion 96 of the intake air temperature sensor 95 is positioned in the middle of the flow of the intake air from the through hole 92 toward the suction port 83, thereby improving the detection accuracy of the intake air temperature sensor 95. The detection portion 96 of the intake air temperature sensor 95 is closer to the suction port 83 than to the through hole 92. Since air is more diffused in the vehicle width direction as from the through hole 92 toward the suction port 83 in the top view, the degree of freedom in layout of the intake air temperature sensor 95 is improved as approaching the suction port 83.

Further, an umbrella portion 94 is formed in the vicinity of the suction port 83, and the detection portion 96 of the intake air temperature sensor 95 is close to the umbrella portion 94. The air flowing from the through hole 92 toward the suction port 83 is partially retained by the umbrella portion 94. In particular, the umbrella portions 94 of the pair of outlet tubes 82 are close to each other, and the air is likely to be retained at the portion where the umbrella portions 94 are close to each other. The detection portion 96 of the intake air temperature sensor 95 is directed between the umbrella portions 94 of the pair of outlet tubes 82. The intake air temperature of the retained air is detected by the detection portion 96 of the intake air temperature sensor 95, thereby improving the detection accuracy of the intake air temperature sensor 95.

The through holes 92 of the pair of outlet tubes 82 face each other, and the air flow from the through holes 92 is easily directed toward the detection portion 96 of the intake air temperature sensor 95. The intake air temperature sensor 95 is attached to the upper wall of the upper case 52, and the detection portion 96 of the intake air temperature sensor 95 is positioned above the outlet tubes 82. Since the intake air temperature sensor 95 is provided in the upper portion of the air cleaner case 51, the intake air temperature sensor 95 is protected from mud, water, or the like rolled up onto the wheel. Further, by using the wide space between the pair of outlet tubes 82, the air flow from the through holes 92 toward the suction ports 83 is easily detected by the detection portion 96 of the intake air temperature sensor 95.

Figure 9:
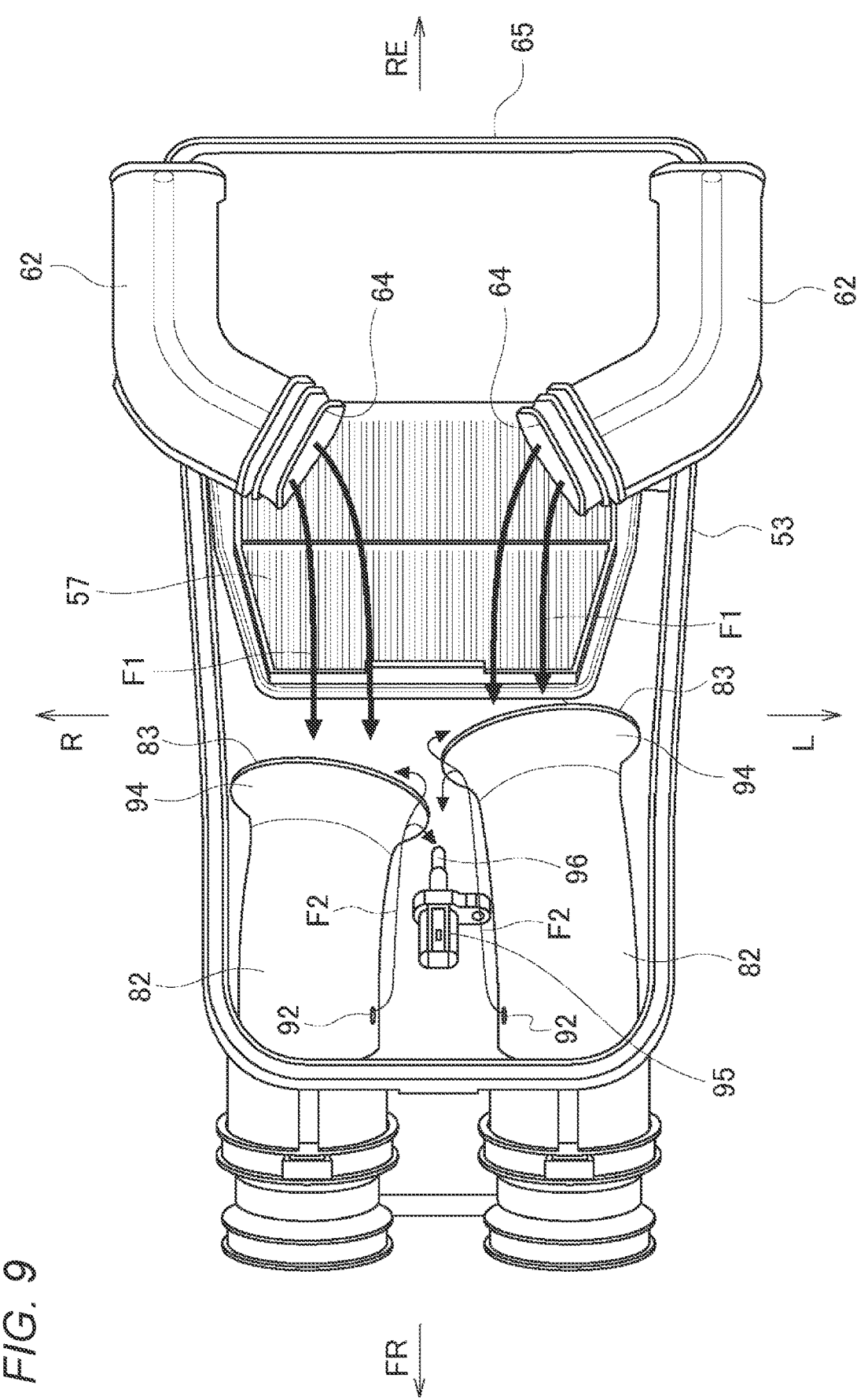
FIG. 9 is a diagram showing an air flow in the air cleaner according to the present embodiment.

The flow of air in the air cleaner will be described with reference to FIG. 9, FIG. 9 is a diagram showing the flow of air in the air cleaner according to the present embodiment.

As shown in FIG. 9, a main air flow F1 is formed between the discharge ports 64 of the pair of inlet tubes 62 and the suction ports 83 of the outlet tubes 82 in a top view. The detection portion 96 of the intake air temperature sensor 95 is disposed downstream of (forward of) the suction ports 83 of the pair of outlet tubes 82, and the main air flow F1 is not hindered by the detection portion 96 of the intake air temperature sensor 95. When the main air flow F1 enters the pair of outlet tubes 82, the air flows from the through holes 92 toward the suction ports 83 of the pair of outlet tubes 82. As described above, an air flow F2 is also formed in the air cleaner 50 at a position deviated from the main air flow F1.

The intake air temperature sensor 95 is disposed between the pair of outlet tubes 82, and the detection portion 96 of the intake air temperature sensor 95 is positioned between the through holes 92 and the umbrella portions 94 of the pair of outlet tubes 82 in a top view. The air flow F2 is partially blocked by the umbrella portions 94 of the pair of outlet tubes 82, and is retained in the vicinity of the umbrella portions 94 of the pair of outlet tubes 82. The detection portion 96 of the intake air temperature sensor 95 is directed toward the umbrella portions 94 of the pair of outlet tubes 82, and the intake air temperature of the air retained in the vicinity of the pair of umbrella portions 94 is detected by the detection portion 96 of the intake air temperature sensor 95, thereby improving the detection accuracy of the intake air temperature sensor 95.

As described above, according to the present embodiment, the main air flow is formed from the inlet tube 62 to the outlet tube 82. Air flows out from the through hole 92 of the outlet tube 82, and air flow is also created at positions deviated from the main air flow. Even if the intake air temperature sensor 95 is disposed at a position deviated from the main air flow, the detection accuracy of the intake air temperature sensor 95 can be improved.

In the present embodiment, a two-cylinder engine is exemplified as the engine, but the type of the engine is not particularly limited.

In the present embodiment, the air cleaner includes a pair of inlet tubes and a pair of outlet tubes, but the numbers of inlet tubes and outlet tubes are not limited. For example, the air cleaner may include a single inlet tube and a single outlet tube, or the air cleaner may include three or more inlet tubes and three or more outlet tubes.

In the present embodiment, the air filter is inclined, but the air filter may also be not inclined. For example, the air filter may be disposed vertically.

Further, in the present embodiment, the detection portion of the intake air temperature sensor is located between the through hole and the suction port in the top view, but the detection portion of the intake air temperature sensor may be located at any position as long as the main air flow is not strongly hindered. For example, the detection portion of the intake air temperature sensor may be located upstream of the suction ports of the outlet tubes, as long as at a position where the main air flow is not strongly hindered. Moreover, the detection portion of the intake air temperature sensor may be located downstream of the through holes.

The umbrella portions are formed in the outlet tubes in the present embodiment, but the shape of the outlet tubes is not particularly limited as long as air can be fed from the intake chamber, For example, the outlet tubes may be not formed with umbrella portions.

The through holes are formed in the peripheral walls on the inner side in the vehicle width direction of the outlet tubes in the present embodiment, but the through holes may also be formed in the peripheral walls on the outer side in the vehicle width direction of the outlet tubes when the intake air temperature sensor is located on the outer side in the vehicle width direction of the outlet tubes.

In the present embodiment, the intake air temperature sensor is attached to the upper wall of the air cleaner case, but the intake air temperature sensor may also be attached to the bottom wall of the air cleaner case.

In the present embodiment, the through holes of the pair of outlet tubes face each other, but the through holes of the pair of outlet tubes may also not face each other.

In addition, in the present embodiment, the pair of outlet tubes is formed with different lengths, but the pair of outlet tubes may also be formed with the same length.

In addition, the air cleaner may be applied not only to the straddle-type vehicle shown in the drawings but also to other types of straddle-type vehicles. The straddle-type vehicle is not limited to general vehicles on which a rider rides in a posture of straddling a seat, and. includes a small-sized scooter-type vehicle on which a rider rides without straddling a seat, As described above, the air cleaner (50) according to the present embodiment is an air cleaner configured to be disposed inside a vehicle body frame (10), and including: an air cleaner case (51) in which an intake chamber (56) is formed; an intake air temperature sensor (95) configured to detect an intake air temperature in the intake chamber; an inlet tube (62) configured to take in air to the intake chamber; and an outlet tube (82) configured to send out air from the intake chamber. The outlet tube has an upstream portion (91) protruding into the intake chamber. The upstream portion of the outlet tube has a peripheral wall formed with a through hole (92). According to this configuration, the main air flow is formed from the inlet tube to the outlet tube. Air flows out from the through hole of the outlet tube, and air flow is also created at positions deviated from the main air flow. Even if the intake air temperature sensor is disposed at a position deviated from the main air flow, the detection accuracy of the intake air temperature sensor can be improved.

In the air cleaner according to the present embodiment, the intake air temperature sensor has a detection portion (96) located downstream of a suction port (83) of the outlet tube in a top view. According to this configuration, it is possible to improve the detection accuracy of the intake air temperature sensor without the intake air temperature sensor blocking the main air flow.

In the air cleaner according to the present embodiment, the detection portion of the intake air temperature sensor is located between the through hole and the suction port in the top view. According to this configuration, an air flow is created from the through hole toward the suction port, and the detection portion of the intake air temperature sensor is positioned in the middle of the flow of the intake air, thereby improving the detection accuracy.

In the air cleaner of the present embodiment, the detection portion of the intake air temperature sensor is closer to the suction port than to the through hole. According to this configuration, since air is more diffused in the vehicle width direction as from the through hole toward the suction port in the top view, the degree of freedom in layout of the intake air temperature sensor is improved as approaching the suction port.

In the air cleaner of the present embodiment, the outlet tube is formed with an umbrella portion (94) expanding toward the suction port. According to this configuration, the air flowing out from the through hole is easily retained by the umbrella portion, thereby improving the detection accuracy of the intake air temperature sensor.

In the air cleaner of the present embodiment, among a peripheral wall on an inner side in a vehicle width direction and a peripheral wall on an outer side in the vehicle width direction of the upstream portion of the outlet tube, a peripheral wall on a side closer to the intake air temperature sensor is formed with a single through hole. According to this configuration, the air flow from the through hole is easily directed toward the detection portion of the intake air temperature sensor, thereby improving the detection accuracy of the intake air temperature sensor.

In the air cleaner of the present embodiment, the intake air temperature sensor is attached to an upper wall of the air cleaner case, and the intake air temperature sensor is positioned on a lateral side of the outlet tube in a top view, and a detection portion of the intake air temperature sensor is positioned above the outlet tube. According to this configuration, since the intake air temperature sensor is provided in the upper portion of the air cleaner case, the intake air temperature sensor is protected from mud, water, or the like rolled up onto the wheel. By using the wide space on the lateral side of the outlet tube, the air flow from the through hole is easily detected by the detection portion of the intake air temperature sensor.

In the air cleaner of the present embodiment, the outlet tube is a plurality of outlet tubes, and the intake air temperature sensor is positioned between the outlet tubes adjacent to each other in a top view, and the through holes of the adjacent outlet tubes face each other. According to this configuration, the air flow from the through holes of the adjacent outlet tubes is easily directed toward the intake air temperature sensor, thereby improving the detection accuracy of the intake air temperature sensor.

Although the present embodiment has been described, the above-described embodiment and modifications may be combined entirely or partially as another embodiment.

The technique of the present invention is not limited to the above-described embodiment, and various changes, substitutions, and modifications may be made without departing from the spirit of the technical concept of the present invention. The present invention may be implemented by other methods as long as the technical concept can be implemented by the methods through advance of the technique or other derivative techniques. Therefore, the claims cover all embodiments that may be included within the scope of the technical concept.

What is claimed is:

1. An air cleaner configured to be disposed inside a vehicle body frame, the air cleaner comprising:
   an air cleaner case in which an intake chamber is formed;
   an intake air temperature sensor configured to detect an intake air temperature in the intake chamber;
   an inlet tube configured to take in air to the intake chamber; and
   an outlet tube configured to send out air from the intake chamber, wherein
   the outlet tube has an upstream portion protruding into the intake chamber, and the upstream portion of the outlet tube has a peripheral wall formed with a through hole,
   the intake air temperature sensor has a detection portion located downstream of a suction port of the outlet tube in a top view, and
   the detection portion of the intake air temperature sensor is located between the through hole and the suction port in the top view.

2. The air cleaner according to claim 1, wherein the detection portion of the intake air temperature sensor is closer to the suction port than to the through hole.

3. The air cleaner according to claim 1, wherein the outlet tube is formed with an umbrella portion expanding toward the suction port.

4. The air cleaner according to claim 1, wherein a side of the peripheral wall closer to the intake air temperature sensor on the upstream portion of the outlet tube is formed with the through hole, wherein the through hole is a single through hole.

5. The air cleaner according to claim 1, wherein the intake air temperature sensor is attached to an upper wall of the air cleaner case, and
   the intake air temperature sensor is positioned on a lateral side of the outlet tube in a top view, and a detection portion of the intake air temperature sensor is positioned above the outlet tube.

6. An air cleaner configured to be disposed inside a vehicle body frame, the air cleaner comprising:
   an air cleaner case in which an intake chamber is formed;
   an intake air temperature sensor configured to detect an intake air temperature in the intake chamber;
   an inlet tube configured to take in air to the intake chamber; and
   an outlet tube configured to send out air from the intake chamber, wherein the outlet tube has an upstream portion protruding into the intake chamber, and the upstream portion of the outlet tube has a peripheral wall formed with a through hole,
   the outlet tube is a plurality of outlet tubes, and
   the intake air temperature sensor is positioned between the outlet tubes adjacent to each other in a top view, and the through holes of the adjacent outlet tubes face each other.

* * * * *